United States Patent [19]

Sager

[11] Patent Number: 5,471,910
[45] Date of Patent: Dec. 5, 1995

[54] AUTOMATIC COFFEE MACHINE

[75] Inventor: Peter Sager, Boppelsen, Switzerland

[73] Assignee: HGZ Maschinenbau AG, Dallikon, Switzerland

[21] Appl. No.: 300,413

[22] Filed: Sep. 2, 1994

[30] Foreign Application Priority Data

Sep. 2, 1993 [DE] Germany ............... 43 29 597.5

[51] Int. Cl.⁶ .................................................. A47J 31/043
[52] U.S. Cl. ...................... 99/289 R; 99/297; 99/302 P
[58] Field of Search ....................... 99/289 R, 286, 99/287, 289 D, 289 P, 295, 297, 300, 302 R, 302 P; 426/433

[56] References Cited

U.S. PATENT DOCUMENTS

| 3,266,410 | 8/1966 | Novi | 99/289 R |
|---|---|---|---|
| 4,457,216 | 7/1984 | Dremmel | 99/287 |
| 4,934,258 | 6/1990 | Versini | 99/289 R |
| 5,230,277 | 7/1993 | Bianco | 99/289 R |
| 5,277,102 | 1/1994 | Martinez | 99/286 |

FOREIGN PATENT DOCUMENTS

| 0192797A1 | 3/1985 | European Pat. Off. . |
|---|---|---|
| 0514313A3 | 5/1992 | European Pat. Off. . |
| 0521561A1 | 6/1992 | European Pat. Off. . |
| 1373832 | 8/1963 | France . |
| 33697A1 | 10/1991 | Germany . |
| 635740A5 | 5/1980 | Switzerland . |

*Primary Examiner*—Robert W. Jenkins
*Attorney, Agent, or Firm*—Hopkins & Thomas

[57] ABSTRACT

An automatic coffee machine, has a heating device (5), which has a heating chamber (6), which is formed from a stationary arranged pipe section (4) with a vertical axis (9) as well as two stoppers (7, 8). An axial drive for moving the upper stopper (7) on a turning arm (29) into and out of the pipe section (4) is provided. A pivot drive serves to move the upper stopper (7) into a parking position away from the axis (9) of the pipe section (4) and into a stand-by position in the axis (9) of the pipe section. A vertical drive for the lower stopper (8) is provided. A driven swivel wiper (32) serves to remove a tablet of coffee grounds. The upper stopper (7) is solidly attached to the turning arm (29). a single motor (10) with a following power divider (16) is provided for the axial drive and for the pivot drive of the turning arm (29) with the upper stopper (7) as well as the drive of the swivel wiper (32). The power divider (16) has a stroke-like driven pivot column (15), an axially secured guide bushing (17), and a stationary grooved bushing (18). The guide bushing (17) and the grooved bushing (18) each have a guiding slot (27, 23) for a crosshead (28), which is connected to the pivot column (15).

11 Claims, 5 Drawing Sheets

AUTOMATIC COFFEE MACHINE

FIELD OF THE INVENTION

The invention is related to an automatic coffee machine for making single cups and pots of coffee, including a flow heater disposed within a casing for providing hot water, and a coffee mill for providing ground coffee powder. The flow heater has a heating device which includes a heating chamber preferably arranged in the flow heater, formed from a stationary pipe section along a vertical axis, and an upper stopper and a lower stopper, with an axial drive for moving the upper stopper on a turning arm in a heating position into and out of the pipe section, a pivot drive for moving the upper stopper into a parking position away from the axis of the pipe section and into a stand-by position along the axis of the pipe section. The coffee machine also has a vertical drive for the lower stopper, and a moveable swivel wiper for the removal of a tablet of spent coffee grounds.

BACKGROUND OF THE INVENTION

An automatic coffee machine is understood to be a machine which the processes of grinding the coffee, bringing the ground coffee into the heating chamber, the brewing itself, and the ejection of the used coffee grounds in the form of pushing out the used and pressed-out tablet of coffe grounds are performed automatically, without these or further steps having to actuated or supported manually. It is understood, though, that the automatic coffee machine has to be started by pushing a button or the like for carrying out such a cycle. The invention may also be applied to a machine for freshly brewing larger quantities.

An automatic coffee machine of the type described above is known from U.S. Pat. No. 5,309,822 to Sager. The upper stopper of the heating device is arranged on a turning arm, which can be pivoted about a fixed bearing. The upper stopper can be pivoted with the turning arm from a stand-by position in the axis of the pipe section above the heating chamber into a parking position out of the axis of the pipe section, in which a pivot drive in the form of an electric motor with a following worm gear is provided for this pivoting. An axial drive is arranged on the turning arm for inserting the upper stopper into the pipe section in a sealing fashion in order to obtain the heating position from the stand-by position. Also, the known automatic coffee machine has a vertical drive for the lower stopper, In this way three drives for moving the two stoppers are provided in the known automatic coffee machine. By the bearing of the turning arm about a fixed bearing it becomes possible to position and guide the upper stopper of the heating chamber from the parking position to the stand-by position and then to the heating position with the required accuracy, without having to form the upper stopper as two parts. Further, the known automatic coffee machine has a swivel wiper for the removal of the tablet of coffee grinds. This swivel wiper is connected to the turning arm. The removal of the used tablet of coffee grinds is performed by pivoting the turning arm about its fixed bearing, the direction of pivoting being equal to the moving into the stand-by position from the parking position. It is therefore necessary to pivot the turning arm to-and-fro twice in one heating cycle. The one to-and-fro pivoting serves to carry out the heating process. The other to-and-fro pivoting serves to remove the used tablet. In the parking position the tablet must have been removed, and the upper stopper may not be located above the heating chamber. The control device of the automatic coffee machine must take this into account.

EP 0 192 797 disloses another coffee machine, which has only a single motor to drive the upper and lower stopper. The upper stopper is fixed to a yoke, which is in turn connected to a drive rod in an nonpivoting manner but is axially movable, which is lifted with respect to and lowered by the motor. The upper stopper therefore is movable only in an axial direction above the heating chamber. By this the passage for the introduction of ground coffee is partially blocked in the parking position of the upper stopper, so that the arrangement of a pivotable coffee supplier becomes necessary. The coffee beans are not ground directly into the heating chamber, but first into the coffee supplier. By a pivoting of the coffee supplier about the axis of the drive rod the coffee supplier is brought into the space between the heating chamber and the upper stopper, and the ground coffee falls into the heating chamber. For the derivation of the pivoting of the coffee supplier the yoke on the drive rod is elongated also to the side facing away from the upper stopper. It has a crosshead, which engages in a groove of a rotating shaft, so that the axial movement of the drive rod is transformed into a rotational movement, which is transferred via a gear and a toothed segment onto the coffee supplier. The lower stopper in its heating position is supported on the bottom of the heating chamber. It has a piston rod, which extends downwardly and cooperates with a carrier arm on the drive rod. In this way also the lower stopper with the tablet lying thereon is lifted by the one motor, in order to transfer said tablet into a position above the heating chamber. The cost of making this coffee machine is relatively low, due to the use of only one motor. On the other hand, a separate coffee supplier is needed. The upper stopper and the lower stopper can be moved only dependant on each other. There is no possibility to grind the coffee directly into the heating chamber. By the actuation of the coffee supplier the height of the drive rod and the yoke is disadvantageously enlarged. The individual parts of the coffee machine must be made relatively precisely, because it is necessary to position the coffee supplier aligned to the axis of the heating chamber. The coffe machine has three axes and a large number of parts. For these large and long parts elaborate guiding elements are necessary. In the heating position the drive rod is subjected to a bending load. A cleaning of the upper piston, e.g. by a shower in between two cycles, is not possible, since this shower water would enter the heating chamber. It is further disadvantageous that a controlled pressing and relieving of the pressure of a precompressed tablet of freshly ground coffee before the brewing process is not possible.

U.S. Pat. No. 4,273,752 to Valeate discloses a device for making espresso coffee, which has a heating device with a heating chamber formed by a vertically arranged stationary pipe section and two stoppers. The stoppers are moved purely linearly, in which the movements of both stoppers are derived from a single motor and a plurality of complicated and elaborate mechanical control elements are applied. This includes a thrust crank arrangement, a variety of cam plates, profile plates, pins, control rods, pivot arms, etc. The device has no turning arm, since only linear movements are derived. This has the disadvantage that the dependability of the control device is as high as in the automatic coffee machine of the type described above, which has a turning arm and therefore supplies a rotating movement of the upper stopper.

SUMMARY OF THE INVENTION

It is an object of this invention to reduce the the number of operating parts and manufacturing cost of an automatic coffee machine of the type described above and at the same time simplify the brewing process, while maintaining the advantages of precompression, relieving of the pressure, ejection, as well as the removal of the tablet of ground coffee.

This is accomplished through a automatic coffee machine of the type described above wherein the upper stopper, a piston which is sized and shaped to open and close the brewing chamber, is fixed to the turning arm, and a single motor is provided as part of a power divider for the axial drive of the upper stopper as well as for the pivot drive of the turning arm to which the upper stopper is fastened, the same motor also acting as as the drive of the swivel wiper. The power divider has a driven pivot column which moves in reciprocating fashion, an axially secured guide bushing, and a stationary grooved bushing, where the guide bushing and the grooved bushing each have a guiding slot for a crosshead, which is connected to the pivot column.

The invention provides a drive for the upper stopper and a separate second drive for the lower stopper, so that the two stoppers may be moved independently with respect to the pipe section of the brewing chamber, in order robe able to carry out the precompression, relieving of the pressure, and lifting of the tablet of ground coffee for brewing. For the upper stopper the number of drive motors is reduced, though, which does not cause a disadvantage in the phases of the brewing cycle. All lifting and pivoting movements of the upper stopper are derived from this one drive with the aid of a simple power divider. The power divider has a pivot column driven in a lift-like, i.e. reciprocating, manner, an axially secured guide bushing, and a stationary grooved bushing. In both the guide bushing and the grooved bushing a gliding slot for a crosshead connected to the pivot column is provided. The pivot column itself is actuated in only lift-like fashion, i.e. lifted and lowered in an axial direction with respect to the casing. A pivoting movement is superimposed on this lifting movement, the pivot column picking up the pivoting movement from the stationary grooved bushing with the aid of the crosshead.

The grooved bushing may be provided as a separate part or as an integral part of the casing. The two gliding slots in the grooved bushing and the guide bushing are coordinated with each other. The crosshead extends through both gliding slots. This makes a rugged, load-bearing construction of the power divider possible. The individual movements can be determined very precisely and reproduced consistently. This relieves the control unit. Some movements are mechanically coupled to the power divider, which not only simplifies the control unit, but which advantageously increases the reliability of operation. A separate vertical drive for the upper stopper as required by the state of the art devices as described above is not needed anymore. With the power divider the movements of the upper stopper and the swivel wiper may be derived from one drive and coordinated with each other. Less sensors are necessary and the mechanical coupling of the movements proves to be advantageous. The wiping effect is coupled to the opening movement of the turning arm, i.e. the pivoting from the stand-by position to the parking position. The number of mechanical parts is reduced and the reliability of operation is increased. It is not necessary to realize and drive a coffee supplier. In that the parking position is attained away from the axis of the brewing chamber, the brewing chamber is freely accessible from above. This makes it possible to install at least one apparatus for supplying ground coffee in a fixed position, so that the coffee may be ground directly into the brewing chamber. By separating the movement of the upper stopper into an axial portion between the heating position and the stand-by position and a thread-like rising portion between the stand-by position and the parking position it becomes possible to arrange up to three or more coffee mills fixed in position with respect to the brewing chamber for supplying ground coffee directly into the brewing chamber, so that different coffees may be ground at will, as is necessary for normal coffee, cappuccino, mocca or the like.

It is especially advantageous when the motor for the turning arm is positioned below the flow heater, and where the power divider passes through the casing of the flow heater. Then both motors for the upper and lower stoppers, respectively, are arranged below the flow heater in a position that is not subject to a great amount of thermal stress. The casing of the flow heater at the same times forms the casing of the power divider, so that a separate casing for the power divider is not necessary. Moreover, this mutual casing accepts the pipe section of the brewing chamber. The result is a single large casing made of one continuous part, the relatively exact manufacturing of which poses no problems. On the other hand this provides automatically the precision necessary for positioning the parts with respect to each other, especially with respect to the distance of the axis of the brewing chamber to the axis of the power divider.

The power divider may be formed so that during the motion of the upper stopper from the stand-by position to the parking position the swivel wiper simultaneously removes a tablet of coffee grounds from a prior brewing cycle. In this the swivel wiper is not connected to the turning arm, but separately supported, so that the movement of the swivel wiper can be separately derived from the power divider. The movement of the upper stopper on the one hand and of the swivel wiper on the other hand are coordinated and coupled via the power divider, though. This coupling is fashioned so that the direction of the wiping movement corresponds to the pivoting direction of the upper stopper from the stand-by position to the perking position. This results in the special advantage that only one to-and-fro pivoting, and thus wiping, movement is necessary during one brewing cycle. The brewing cycle thus becomes faster to perform and easier to control.

The gliding slot in the grooved bushing has a starting region spaced apart from and parallel to axis of the upper stopper for bringing the upper stopper from the brewing position to the stand-by position and vice versa. In this axially parallel starting region a turning motion of the pivot column is prevented and a lifting motion of the upper stopper in alignment with the axis of the brewing chamber's pipe section and parallel to the axis of the pivot column is ensured. This must happen at least in the region in which the upper stopper is located in the pipe section of the brewing chamber- A gradual transition from this region to the thread-like ascending region is preferable.

The thread-like ascending region pivots the turning arm with the upper stopper from the stand-by position to the parking position and vice versa. In this the upper stopper moves away from the axis of the pipe section, so that the space above the pipe section becomes free on the other hand the stand-by position is arranged relatively lower than the parking position, so that discharge chutes from coffee grinders located above the pipe section may be easily passed under by the turning arm as it passes into its stand-by position.

At the same time the relative lifting of the upper stopper into the parking position is advantageous in that this makes a showering position for passing clean water through the upper stopper and squeezing a corresponding amount of water into the brewing chamber and through the lower piston. This shower water may be channeled away by a drain and is thus kept out of the brewing chamber.

The swivel wiper is arranged behind the upper stopper, i.e. it follows the upper stopper from the stand-by position to the parking position during the pivoting. This has the advantage that the space into which the used coffee tablet is lifted is free of the upper stopper so that the swivel wiper may effect its action. The swivel wiper is approximately semicircular in shape, in which the concave side is assigned to the upper stopper. It is then possible to use the swivel wiper to remove the tablet at the same time as pivoting the upper stopper from the stand-by position to the parking position, without complicating the brewing cycle.

The gliding slot in the guide bushing may suitably be arranged spaced apart from and parallel to the axis of the the guide bushing. The gliding slot then runs in a straight line and can be easily manufactured. The pivoting movement is derived from the thread-like ascending region of the gliding slot of the grooved bushing. On the other hand it is naturally possible to also fashion the gliding slot in the guide bushing in a thread-like ascending or descending way, according to the desired movement of the swivel wiper.

The turning arm is advantageously elongated extending past the pivot column on its side facing away from the upper stopper with a stop formed thereon. A counterstop is provided on the casing of the flow heater, the stop of the turning arm being supported on said counterstop in the brewing position of the upper stopper. The stop or the counterstop may be adjustable, so that the position of the upper stopper in the brewing position is defined in this way. If a pressure in the brewing chamber acts on the upper stopper during the brewing process, a corresponding counterforce may be taken up between the stop and the counterstop, so that the pivot column is not ultimately subjected to a bending load. This benefits the pivot column bearing, reliability of operation, and service life. The guide bushing at the same time forms the bearing for the pivot column.

The swivel wiper is suitably connected to the guide bushing in a non-rotatable way, so that any turning of the guide bushing is correspondingly transferred to the swivel wiper. The guide bushing is prevented from performing an axial movement and can pivot only about its location, corresponding to the interplay of the crosshead and the two gliding slots.

The motor for driving the pivot column may be an electric motor, especially a d.c. motor. A worm gear and a nut/spindle-unit can be provided in between the motor and the power divider, in which case the spindle is connected to the pivot column in a non-rotatable manner. The nut pivots, but is prevented from axial movement, so that as the nut turns about its position, via the worm gear, which results in an axial non-rotating, i.e. reciprocating, movement of the pivot column. On the other hand the motor for the pivot column drive could also be fashioned as a hydromotor. The use of an electric motor with the possibility of its accurate and reproduceable control is preferable, though.

The motor for moving the lower stopper may also be an electric motor, again a d.c. motor. Both drives motors can be fashioned similarly.

The design and arrangement of the gliding slots in the grooved bushing and the guide bushing are matched to the desired extent of relative movement. The gliding slot in the grooved bushing may have an axially parallel end section, in order to both begin and end from the parking position with an axial movement.

BRIEF DESCRIPTION OF THE DRAWINGS

The invention is further explained and described with the aid of a preferred embodiment. The drawing shows.

DETAILED DESCRIPTION OF THE PREFERRED EMBODIMENT

Figure 1:
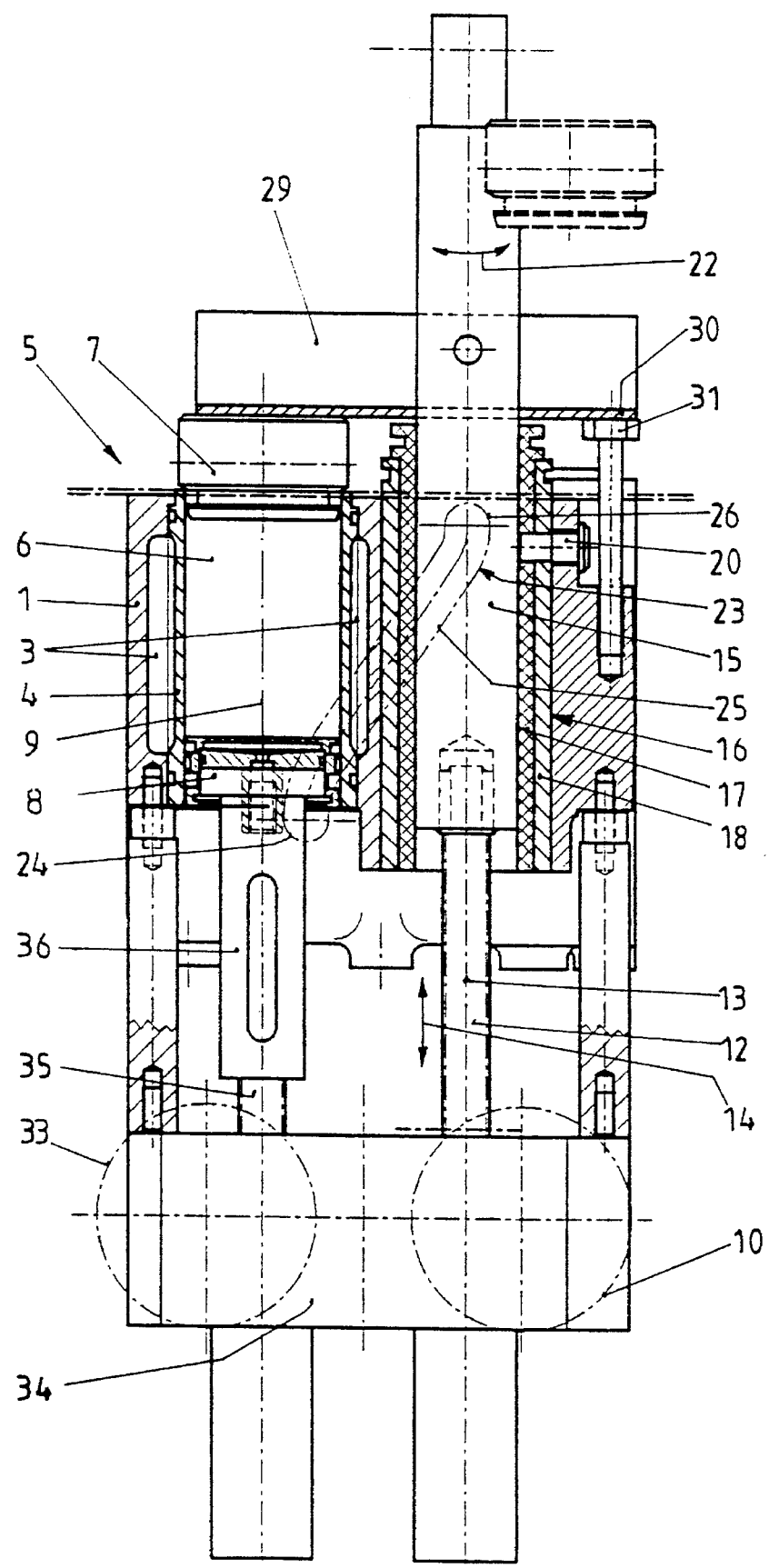
FIG. 1 a vertical cross section through major parts of the automatic coffee machine, FIG. 2 a side elevational view of the automatic coffee machine according of FIG. 1, FIG. 3 a top plan view of the automatic coffee machine, FIG. 4 a cross section view through the power divider, FIG. 5 a front elevational view of the power divider, and FIG. 6 a horizontal cross section of the power divider according to line VI—VI in FIG. 4.
Figure 2:
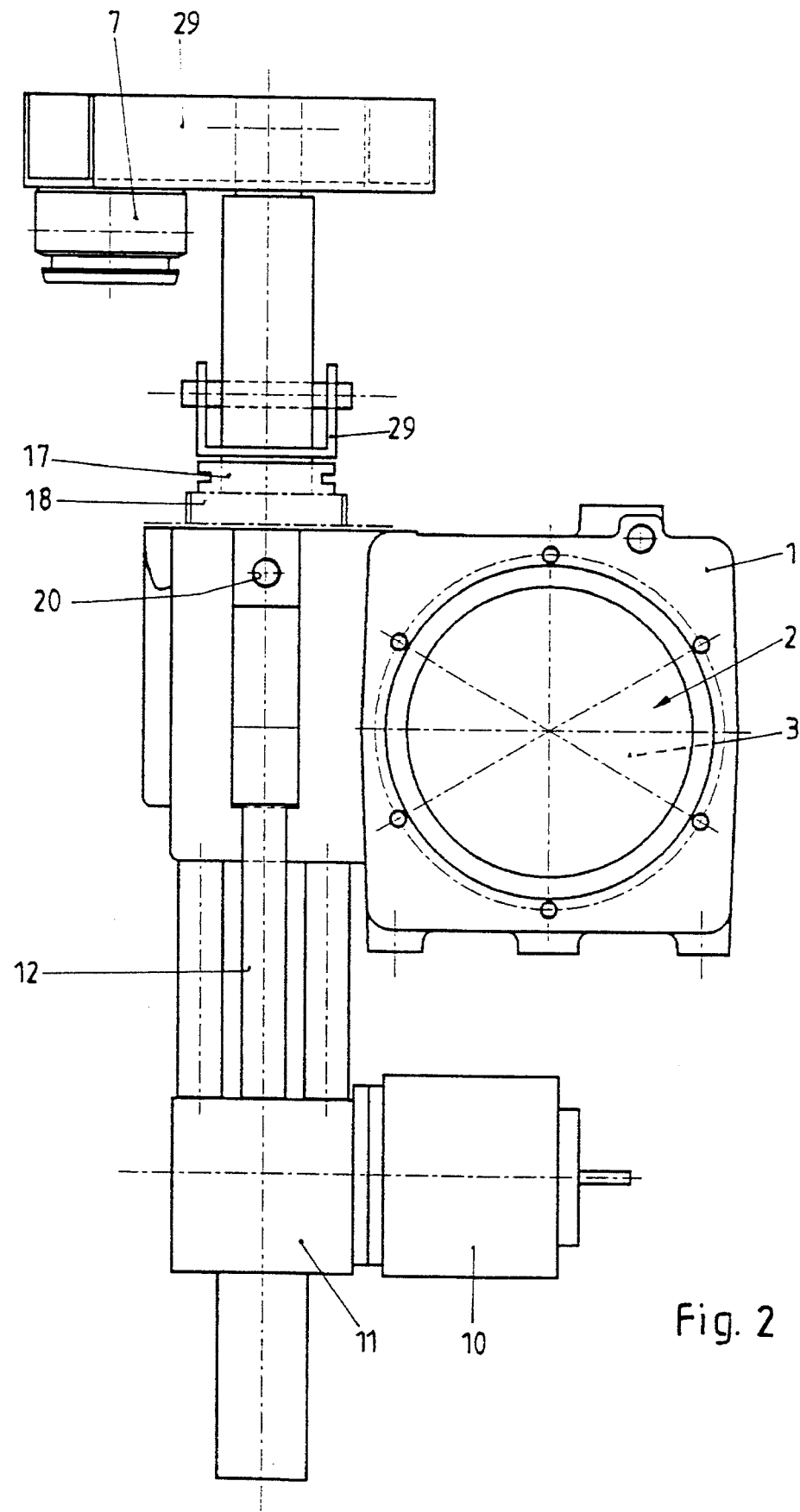
Figure 3:
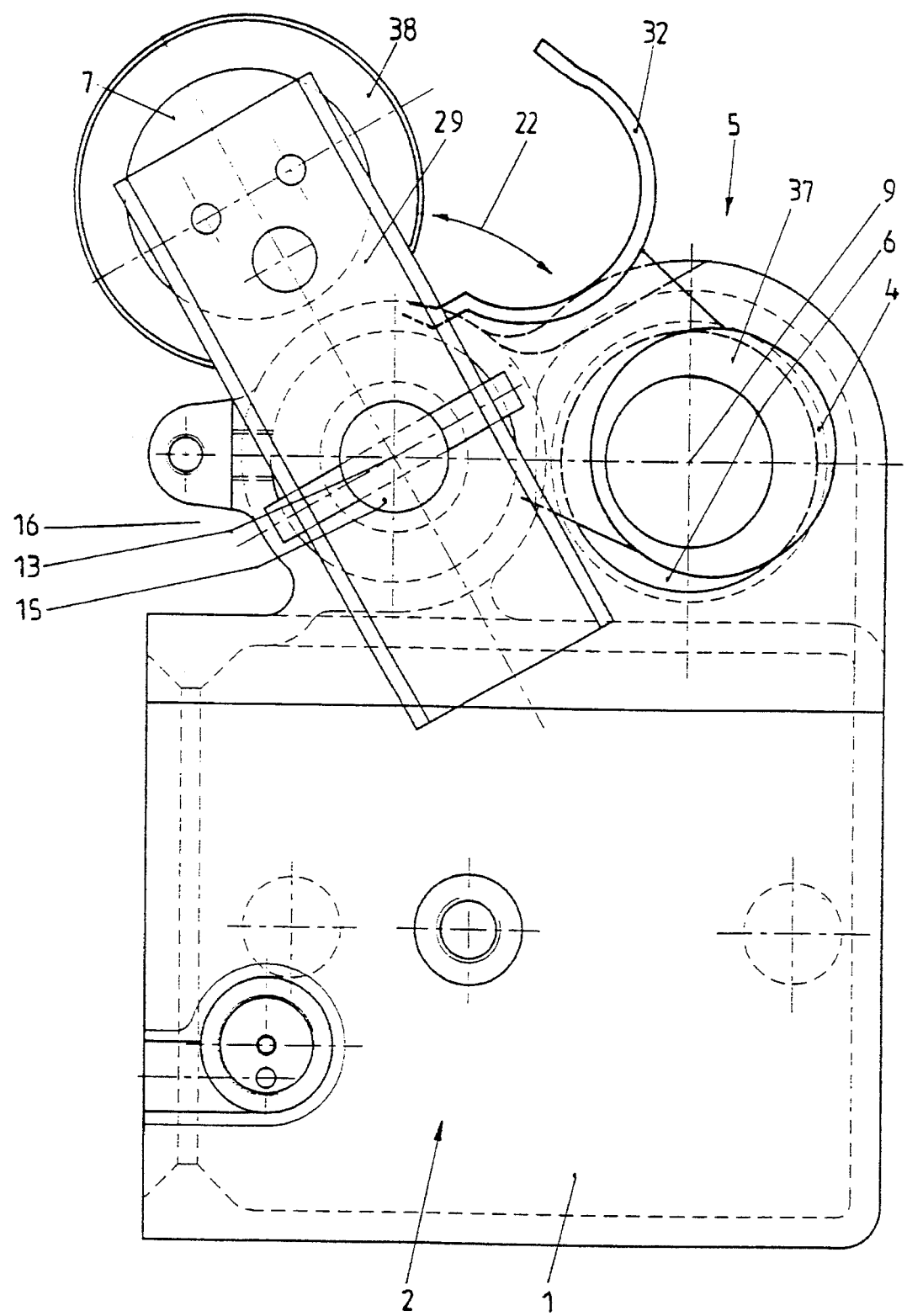

The automatic coffee machine according to the FIGS. 1 to 3 has a casing 1, inside of which a flow heater 2 (not illustrated) with its hot water reservoir 3 is contained. The hot water reservoir 3 surrounds a pipe section 4, which forms a major part of a brewing device 5 inserted in the casing 1 in a sealing way. The brewing chamber 6 of the brewing device 5 includes an upper stopper 7 and a lower stopper 8. The upper stopper 7 is formed to bed water piston, i.e. during the brewing process the water is introduced into the brewing chamber 6 and sent through the ground coffee from there. The lower stopper 8 is formed as a coffee piston, i.e. it serves as a carrier for the tablet of ground coffee. In principle stoppers 7 and 8 may also be used with respect to one another inversely. The lower stopper 8 always remains in the pipe section 4 and is axially moved along vertical axis 9. The upper stopper 7 on the other hand is moved out of the pipe section 4 along axis 9 and then pivoted sideways, so that the unobstructed opening of the pipe section 4 with respect to the brewing chamber 6 may be supplied with ground coffee. The two stoppers 7 and 8 are fashioned as pistons and provided with gaskets, which are not shown in the interest of clarity. The lower stopper 8 is provided with a sieve through which the coffee drink passes and with a spout for the coffee drink.

Figure 4:
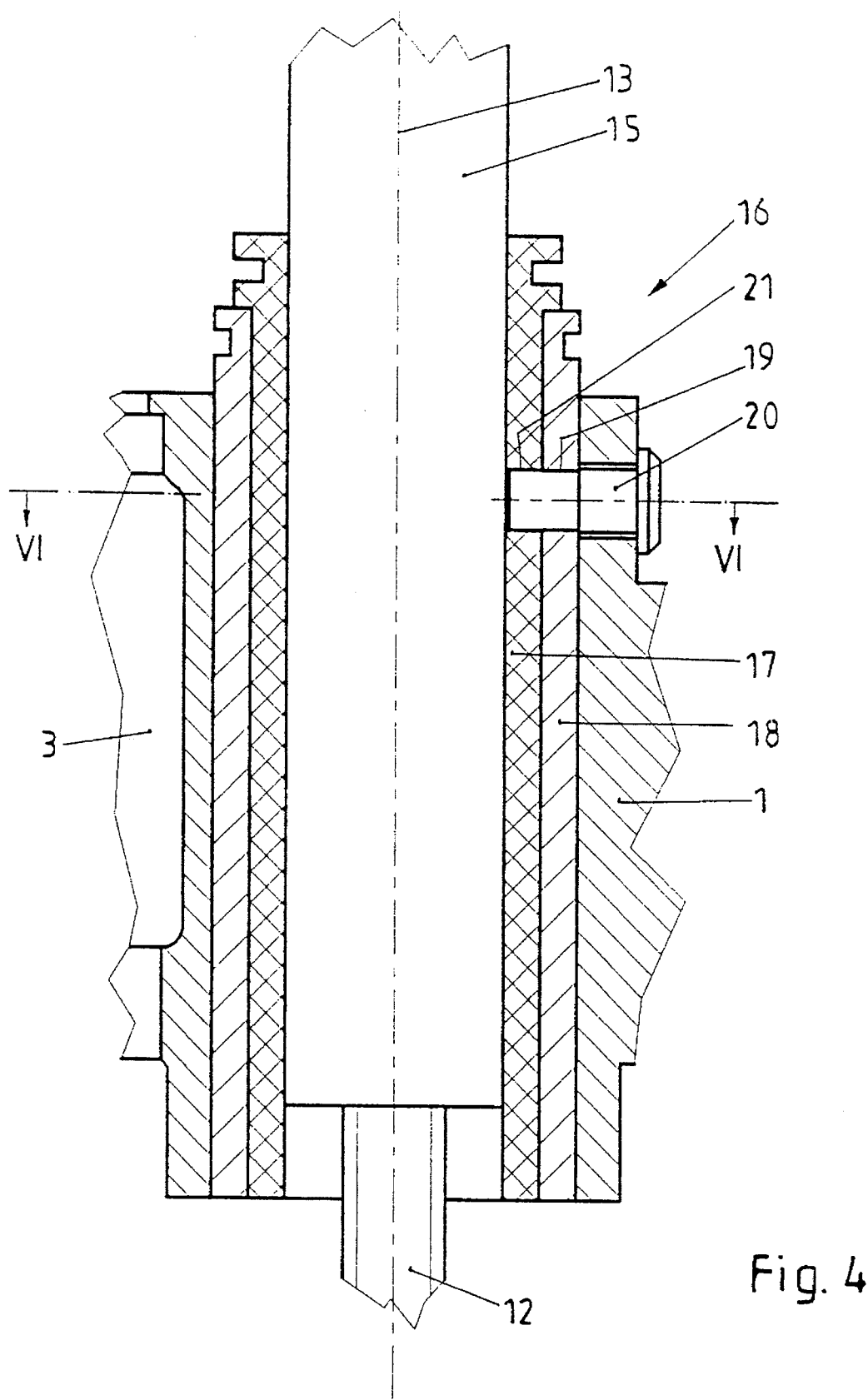

A single motor 10, which is arranged below the casing 1, is provided for the movement of the upper stopper 7. A worm gear 11 is driven by motor 10. A nut/spindle unit, the spindle 12 of which is provided with a vertical axis 13. The axis 13 extends spaced apart from and parallel to axis 9. The nut (not shown in detail) assigned to the spindle 12 can be turned, but is axially fixed, so that a turning of the nut results in an axial movement of the spindle 12 in the direction of the axis 13 according to the double arrow 14. The spindle 12 is solidly attached to a pivot column 15 of a power divider 15 in a non-rotating manner. The power divider 16 also extends through the casing 1 of the flow heater 2. From FIG. 3 it can be seen how the casing 1 of the flow heater 2 extends sideways so that the brewing device 5 and the power divider 16 are housed within casing 1. The power divider 16 has from the inside to the outside the pivot column 15, a guide bushing 17 and a grooved bushing 18. The power divider 16 is shown in more detail in FIGS. 4 to 6. The grooved bushing 18 is supported in the casing 1 in a fixed position. To this end grooved bushing 18 has a bore hole 19, through which a stud 20 is passed and is screwed into the casing 1 radially from the outside to the inside, and thus keeps the grooved bushing from rotating and moving axially. The stud 20 passes through not only grooved bushing 18, but also into guide bushing 17. The guide bushing 17 has a slot 21 formed at this location, which extends radially about the circumference of the guide bushing 17 over an angle of about 120", as can be seen from FIG. 6. The stud 20 thus prevents the axial movement of the guide bushing 17 according in the direction of double arrow 14, but on the other hand allows a relative pivoting abut the axis 13 according to the double arrow 22.

Figure 5:
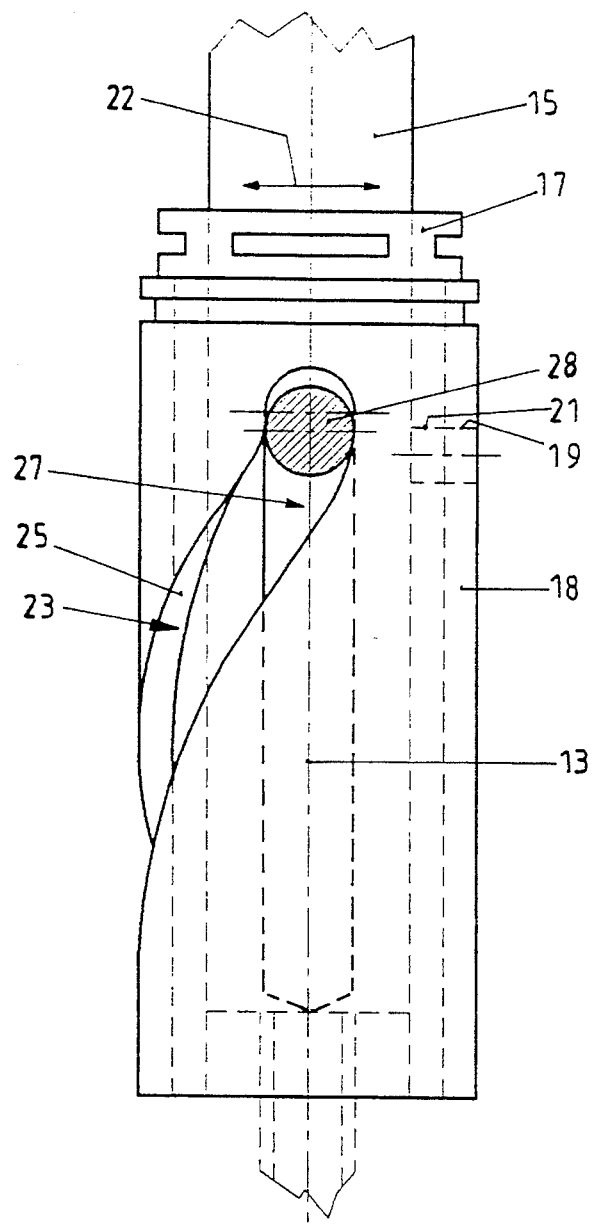
Figure 6:
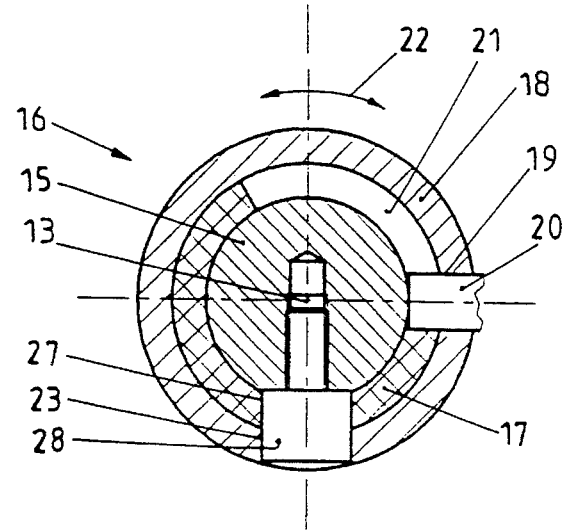

A gliding slot 23, which is shown in the dot-dashed line in FIG. 1 wound off in the plane, is defined in the fixed grooved bushing 18. The gliding slot 23 has a starting region 24 on its lower end which is spaced apart from and parallel to axis 13 of pivot column 15, which merges into a thread like ascending region 25. At its upper end the gliding slot may again have an axially parallel end section 26. The guide bushing 17 also has a gliding slot 27, which extends parallel to axis 13 (FIG. 5). The gliding slot 27 could also be formed to be thread-like ascending or descending, though. A crosshead 28 (FIGS. 5 and 6) is passed into the two gliding slots 23 and 27, said crosshead 28 being affixed to the pivot column 15 and extending radially outwards through gliding slots 27 and 23. The grooved bushing 18 is suitably made of metal, while the guide bushing 17 is preferably formed as a preformed plastic part. The guide bushing 17 at the same time forms the bearing for the pivot column 15 of the power divider 16. The pivot column 15 not only extends through and above casing I in a vertical direction. A turning arm 29 (FIG. 1) is attached to the pivot column 15 so that it does not rotate with respect to the pivot column. The upper stopper 7 of the brewing device 5 is connected to the free end of turning arm 29. Turning arm 29 has on its side facing away from the upper stopper 7 a stop 30, which is sized and shaped to abutt a counterstop 31 supported on the casing 1. The counterstop 31 may be formed as an adjustable screw, in order to set the heating position of the upper stopper 7 and to form a support for the upper stopper 7 in the heating position.

To the upper end of the guide bushing 17 a swivel wiper 32 (FIG. 3) as well as a funnel 37 are nonrotatably connected, which, like the guide bushing 17, thus perform a purely pivoting or turning movement about the axis 13 according to the double arrow 22. In its parking position the funnel 37 reaches a position above the heating chamber 6 with respect to axis 9, so that in a further brewing cycle ground coffee may enter the brewing chamber 6 from a mill via a chute and the funnel 37. In the parking position the upper stepper 7 is located above a fixed drain funnel 38, so that the upper stopper may be cleaned by a shower of hot water.

Regarding the movement of the upper stopper 7, three positions can be discerned. The first is the brewing position, in which the upper stopper 7 is driven into the pipe section 4 of the brewing chamber 6, as shown in FIG. 1 in solid lines. In this position the brewing process is carried out. A stand-by position is the position in which the upper stopper 7 is still in line with the axis 9, but outside and above the pipe section 4. This position is not illustrated in any of the figures. Finally, there is a parking position of the upper stopper 7, which is shown in FIG. 1 in flashed lines, and in FIGS. 2 and 3 in solid lines. In the parking position the upper stopper 7 is on the one hand pivoted out of the axis 9 of the pipe section 4 according to the double arrow 22. On the other hand, it is lifted in an axial direction and is located above the drain funnel 38 and a drain pipe for the cleaning water, in order to be able to perform a showering and cleaning process for the upper stopper 7. The parking position at the same time is the position in which the upper stopper 7 is located in between two brewing cycles, i.e. each brewing cycle starts and ends in the parking position.

A seperate drive is also provided for the lower stopper 8, which functions solely as a lifting drive along the axis 9 according to the double arrow 14. The drive has a motor 33, which like the motor 10 for the upper stopper is arranged below the casing on a mutual bearing plate 34. It is anticipated that motors 10 and 33 will be electric motors, and may be hydro-motors, or the like. It is possibile to have identical motors 10 and 33. Following the motor 33 there is also a worm gear (not shown). By way of an axially secured, pivotably supported nut, a spindle 35 is axially driven in the direction of the axis 9 according to the double arrow 14. The spindle 35 is connected to a piston rod 36, to the upper end of which the lower stopper 8 is attached. The lower stopper 8 is shown in its lower end position in FIG. 1. It is driven further into the brewing chamber 6 for reaching the brewing position. In the course of one brewing cycle the lower stopper 8 can be driven up into the pipe section 4 so that the upper surface of the lower stopper is flush with the outer end plane of the casing 1.

OPERATION

A brewing cycle takes the following course: The upper stopper 7 is in the parking position shown in the dashed lines in FIG. 1 (See also FIG. 3). The lower stopper 8 is in its lowest position, as shown in FIG. 1. The pipe section 4 of the brewing chamber 6 is thus open at its top. By starting the brewing cycle at a control unit not detailed here, coffee is freshly ground by a coffee mill (not shown). It falls along a chute provided on the mill and the funnel 37 into the heating chamber 6 and therefore onto the lower stopper 8. Since the turning arm 29 with the upper Stopper 7 is pivoted about a relativ ly large pivot angle (FIG. 3) in the parking position, there is the possibility to have up to three coffee mills end with their chutes above the heating chamber, in order to grind different coffee beans into the heating chamber 6 according to the desired coffee beverage. When the grinding process is finished the motor 10 is started in such a revolving direction that the turning arm 29 with the upper stopper 7 is pivoted from the parking position into the stand-by position. This happens by a combined pivoting and lowering process in a clockwise direction about the axis 13 according to the double arrow 22 (FIG. 3), in which also the swivel wiper 32 with the funnel 37 is pivoted. Even though the spindle 12 and therfore the pivot column 15 are lowered by the motor 10 only in the direction of the axis 13, a pivoting movement is superimposed by the thread-like descending region 25 of the gliding slot 23 via the crosshead 28 of the pivot column 15, which lasts until the end of the region 25 reaches the transition point to the axially parallel region 24 of the gliding slot 25. The upper stopper 7 is then positioned with its axis aligned with axis 9, though it is still above and outside of the pipe section 4. With this movement of the turning arm, guide bushing 17 along with swivel wiper 32 and the funnel 37 connected thereto are moved in a backwards movement. This is a purely pivoting motion in a clockwise direction according to the double arrow 22 (FIG. 3). The swivel wiper 32 has no function in this. In a corresponding formation this movement can be used to remove accidentally deposited ground coffee from the surface of the casing 1 in the region of the pipe section 4, though.

The stand-by position is passed through without a stopping of the motor 10. The crosshead 28 thus comes past the transition region into the axially parallel starting region 24 of the gliding slot 23, so that the upper stopper 7 is driven in a purely axial descending movement from the stand-by position into the brewing position with its gasket into the pipe section 4. The brewing position for the upper stopper 7 is reached, as shown in FIG. 1. Simultaneously the stop 30 comes to rest on the counterstop 31. The brewing position is reached. Now the motor 33 for the lower stopper 8 is activated, and a lifting of the lower stopper 8 follows, which is driven upwards so far that the ground coffee in the heating chamber is compressed into a tablet. In this the lower stopper 8 is pressed against the fixed upper stopper 7. After this compression a relief of the pressure on the tablet may advantageously follow, i.e. the direction of rotation of the motor 33 is reversed. It is understood that the distance that the lower stopper 8 is driven downwards again is correspondingly short. Now the actual brewing process may start, in which the control unit opens a corresponding valve and starts a pump for hot water, so that a corresponding amount of hot water flows through the upper stopper 7, the compressed tablet of ground coffee, and the lower stopper 8, so that the resulting coffee beverage is transferred from the coffee drain into a cup, a pot or some other suitable container. The brewing process is then finished, whereupon upper stopper 7 can be driven back from the heating position to the stand-by position and further into the parking position. To this end the motor 10 is activated in its other direction of rotation, by which the crosshead 28 at first acts in the axially parallel starting region 24 of the gliding slot 23, so that the upper stopper 7 is lifted axially upwards from the heating position into the stand-by position. The stand-by position is passed and the crosshead 28 Reaches the ascending region 25 of the gliding slot 23, which on the one hand causes the pivoting of the turning arm 29 with the upper stopper 7 from the stand-by position into the parking position. On the other hand the swivel wiper 32, which is located at the guide bushing 17, is also pivoted in a clockwise direction (FIG. 3), in which it swings across the surface of the casing 1. Coordinated with this pivoting the motor 33 for the lower stopper was activated, and the used tablet of coffee grounds lifted by a lifting process in the pipe section 4 so far above the surface of the casing 1 that this tablet is taken hold of by the swivel wiper 32 during the return movement of the turning arm 29 and discharged sideways into a container for used tablets of coffee grounds. As soon as the tablet has been discharged the motor 33 is again activated in the opposite direction, in order to. Teach the lower position according to FIG. 1. At the same time the upper stopper 7 reaches the parking position above the drain funnel 38, and the showering and cleaning process may start. The funnel 37 is located above the heating chamber 6 and guides freshly ground coffee into the brewing chamber at the beginning of a new brewing cycle.

LIST OF REFERENCE NUMERALS

1—casing
2—flow heater
3—hot water reservoir
4—pipe section
5—brewing device
6—brewing chamber
7—upper stopper
8—lower stopper
9—axis
10—motor
11—worm gear
12—spindle
13—axis
14—double arrow
15—pivot column
16—power divider
17—guide bushing
18—grooved bushing
19—bore hole
20—stud
21—slot
32—double arrow
23—gliding slot
24—axially parallel starting region
25—ascending region
26—end section
27—gliding slot
28—crosshead
29—turning arm
30—stop
31—counterstop
32—swivel wiper
33—motor
34—bearing plate
35—spindle
36—piston rod
37—funnel
38—drain funnel

I claim:

1. An automatic coffee machine for making single cups and pots of coffee, the coffee machine including a casing, a flow heater disposed within the casing, a brewing device disposed within the casing, the brewing device including an elongated tubular body about an upstanding axis as the brewing chamber, a coffee mill for providing ground coffee to the brewing chamber, a first stopper, a turning arm, the first stopper being rigidly attached to the turning arm, the first stopper having a parking position with respect to the brewing chamber, a stand by position along the axis of the brewing chamber, and a brewing position within said brewing chamber, an axial drive for moving the first stopper along the axis of, and within, the brewing chamber between its brewing and stand by positions, a pivot drive for moving the turning arm and the first stopper from its parking position into its stand by position and back into its parking position, a second stopper, the second stopper being movably held within the brewing chamber, a vertical drive for moving the second stopper along the axis within the brewing chamber, a swivel wiper, the swivel wiper being supported on the casing and adapted to remove spent coffee grounds from the brewing chamber, comprising:

a power divider;
a motor, wherein both the axial drive and the pivot drive are powered by said motor and wherein said motor and power divider also operate the swivel wiper;
wherein said power divider comprises:
a stationary grooved bushing mounted in said casing and spaced apart from and parallel to the axis of the brewing chamber,
a guide bushing received within the grooved bushing, said guide bushing being secured within the grooved bushing so that it does not move upward and downward within the grooved bushing, an elongated pivot column received within said guide bushing, said pivot column supporting the turning arm, and said pivot column being secured within said guide bushing so that it is free to rotate and move upward and downward within the guide bushing, and a crosshead fastened to said pivot column in a generally horizontal direction, wherein said crosshead extends from the pivot column into the guide bushing and the grooved bushing;

wherein said guide bushing has an elongated glide slot defined therein, and the grooved bushing has an elongated glide slot defined therein, so that the crosshead travels in both glide slots simultaneously;

whereby the power divider moves the first stopper from its parking position to its stand by position while the swivel wiper removes any spent coffee grounds from the brewing chamber, and also moves the first stopper into its brewing position and then back into its stand by position after coffee has been brewed in the coffee machine, and then moves the first stopper back into its parking position.

2. The coffee machine of claim 1, wherein said motor is positioned below said flow heater, and the power divider passes through said casing and the flow heater.

3. The coffee machine of claim 1, wherein the power divider is adapted to operate the swivel wiper for removing spent coffee grounds from the brewing chamber as the first stopper moves from its parking position to its stand by position.

4. The coffee machine of claim 3, wherein the glide slot defined within the grooved bushing has a starting region for bringing the first stopper from its brewing position to its stand by position, said slot forming the starting region being parallel to the axis of the brewing chamber, and wherein said slot has an ascending region for pivoting the turning arm and the first stopper from the stand by position to the parking position, said ascending region being formed as a helical slot within the grooved bearing.

5. The coffee machine of claim 4, wherein the glide slot defined in the grooved bushing includes an end region, the end region being defined within the grooved bushing parallel to the axis of the brewing chamber.

6. The coffee machine of claim 1, wherein the glide slot defined within the guide bushing is parallel to the axis of the brewing chamber.

7. The coffee machine of claim 1, wherein said pivot column is fastened to the turning arm intermediate the ends of the turning arm, and the first stopper is fastened to the turning arm at one of its ends, and a stop is fastened to the opposite end of the turning arm, and wherein a counterstop is mounted on the casing, so that said stop and said counterstop abuts one another when the turning arm has been moved into its brewing position.

8. The coffee machine or claim 1, wherein said swivel wiper is attached to the guide bushing.

9. The coffee machine of claim 1, wherein said power divider further comprises a worm gear and an integral nut-spindle for transmitting the power of the motor to the power divider, and said motor is a D.C. electric motor.

10. The coffee machine of claim 1, wherein the vertical drive for the second stopper comprises a D.C. electric motor.

11. An automatic coffee machine for making single cups and pots of coffee, comprising:

a casing;

a flow heater disposed within the casing;

a brewing device disposed within the casing, the brewing device including a brewing chamber formed as an elongated tubular body about an upstanding axis;

means for providing ground coffee to the brewing chamber;

a first stopper;

a turning arm, wherein said first stopper is rigidly attached to said turning arm, and wherein said first stopper has a parking position with respect to the brewing chamber, a stand by position along the axis of the brewing chamber, and a brewing position within said brewing chamber along said axis;

an axial drive for moving the first stopper along the axis of the brewing chamber from said stopper's stand by position into its brewing position and beak into its stand by position;

a pivot drive for moving the turning arm and the first stopper from its parking position into its stand by position and back into its parking positions;

a second stopper, wherein said second stopper is movably held within said brewing chamber;

a vertical drive for moving the second stopper toward and away from the first stopper along the axis within the brewing chamber;

a swivel wiper, wherein said swivel wiper is supported on the casing and is adapted to remove spent coffee grounds from the coffee machine;

a motor, wherein said axial drive and said pivot drive share said motor;

a power divider, wherein the motor and the power divider operate the swivel wiper, and said power divider includes:

a stationary grooved bushing mounted in said casing spaced apart from and parallel to the axis of the brewing chamber, a guide bushing received within the grooved bushing, said guide bushing being secured within the grooved bushing so that it does not move upward and downward within the grooved bushing, an elongated pivot column received within said guide bushing, said pivot column supporting the turning arm, the pivot column being secured within said guide bushing so that the pivot column is free to rotate and move upward and downward within the guide bushing, and a crosshead fastened to said pivot column in a generally horizontal direction, and extending from the pivot column into the guide bushing and the grooved bushing;

wherein said guide bushing has an elongated glide slot defined therein, and the grooved bushing has an elongated glide slot defined therein, so that the crosshead travels in both glide slots simultaneously;

whereby the power divider, driven by a single motor, moves the first stopper from its parking position to its stand by position while removing any spent coffee grounds from the coffee machine with the swivel wiper, and moves the first stopper into its brewing position, back into its stand by position, and then back into its parking position.

* * * * *